No. 670,608. Patented Mar. 26, 1901.
T. L. DENNIS.
BICYCLE.
(Application filed July 1, 1898.)
(No Model.) 2 Sheets—Sheet 1.
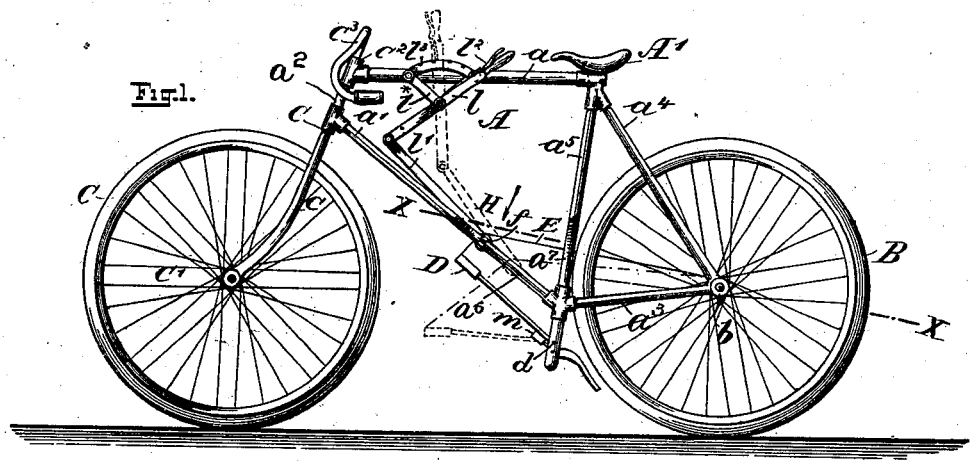
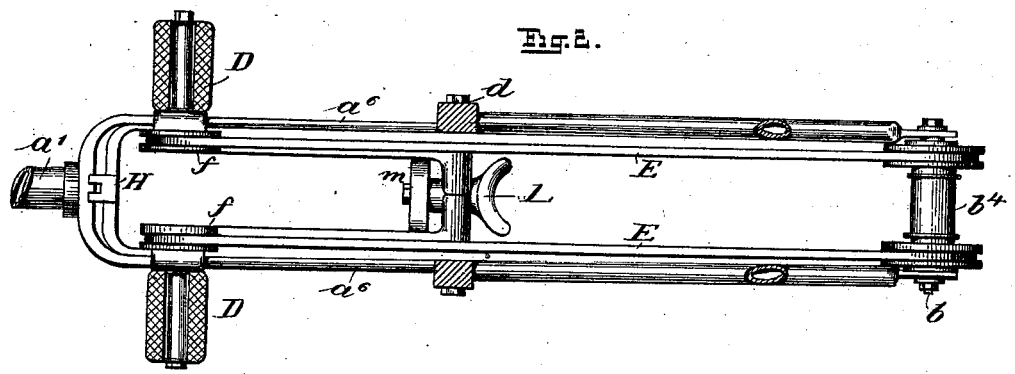
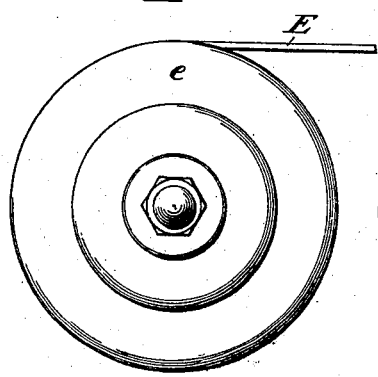
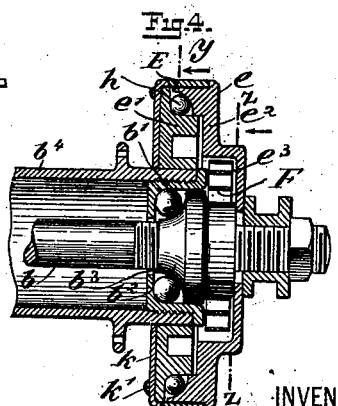
WITNESSES:
INVENTOR
ATTORNEY.

No. 670,608. Patented Mar. 26, 1901.
T. L. DENNIS.
BICYCLE.
(Application filed July 1, 1898.)
(No Model.) 2 Sheets—Sheet 2.
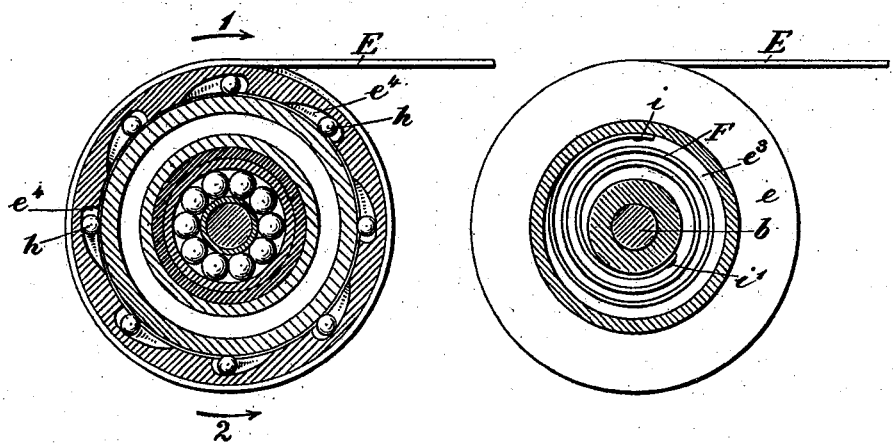
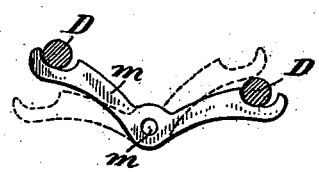
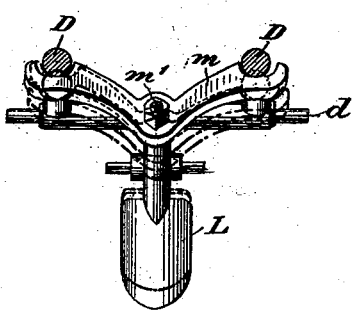
WITNESSES:
Geo. W. Naylor.
Fr. N. Roehrich.
INVENTOR
Thomas L. Dennis.
BY
ATTORNEY

UNITED STATES PATENT OFFICE.

THOMAS L. DENNIS, OF BROOKLYN, NEW YORK.

BICYCLE.

SPECIFICATION forming part of Letters Patent No. 670,608, dated March 26, 1901.

Application filed July 1, 1898. Serial No. 684,960. (No model.)

*To all whom it may concern:*

Be it known that I, THOMAS L. DENNIS, a citizen of the United States, and a resident of Brooklyn, in the county of Kings and State of New York, have invented certain new and useful Improvements in Bicycles, of which the following is a specification.

This invention, while relating to bicycles generally, has reference more particularly to that class thereof in which the power applied to the pedals is communicated to the rear or other wheel without intervention of sprocket-wheels, its object being to provide a bicycle of this class which, while simple in construction and less liable to derangement of parts from accidents and otherwise than those heretofore in use, shall at the same time permit of varying the amount of power communicated from the pedals to the wheel driven therefrom.

To these ends the invention consists in the peculiarities of construction and combinations of parts, all as will hereinafter more fully appear.

Referring to the accompanying drawings, which form a part of this specification, Figure 1 is a side elevation of a bicycle constructed in accordance with the invention; Fig. 2, a detail sectional plan thereof, taken on the line $x\ x$ of Fig. 1, with the spokes and rim of the rear wheel omitted; Fig. 3, a side elevation of one of the friction-clutches through which and appropriate connections the power is transmitted from the pedals to the rear or other wheel; Fig. 4, a vertical section of one of these friction-clutches, taken axially of Fig. 3, but showing the supporting-shaft, the ball-bearing cone, and collar to which one end of the clutch-returning spring is secured in elevation; Fig. 5, a transverse sectional elevation of such clutch, taken in the plane $y\ y$ of Fig. 4; Fig. 6, a similar transverse sectional elevation of said clutch, taken in the plane $z\ z$ of that figure; Fig. 7, a front elevation of the cross-bar on the brake, showing also the two pedals in transverse section; and Fig. 8, a front elevation of the brake and cross-bar thereon, showing also the two pedals in transverse section.

In all the figures like letters of reference are employed to designate corresponding parts.

A indicates the frame, which is or may be of any ordinary or preferred construction and is provided with the usual saddle A' for the accommodation of the rider. As here shown, however, this frame is constructed of a general "diamond" form and is composed of an upper main tube $a$, a lower main tube $a'$, a front frame-tube $a^2$, back forks $a^3$, back stays $a^4$, and a center stay $a^5$, which are suitably joined by brazing or otherwise to form the required structure, as is common to this form of frame as heretofore constructed. The lower main tube $a'$ and the center stay $a^5$, however, instead of being made as continuous tubes throughout the rear end of the former and the lower end of the latter are respectively made as forks the cross-sections of whose respective blades or tines $a^6$ and $a^7$ are rectangular or otherwise, as may be desired. In some cases these forked ends are made integral with their respective tubes and in others they are made separate therefrom and secured thereto by brazing or otherwise. It is preferred, however, to make the fork of the center stay $a^5$ integral therewith and to make the fork of the lower main tube $a'$ as a separate part and afterward join it thereto by an appropriate connection. As thus constructed the free extremities of the blades or tines $a^6$ of the lower main tube $a'$ and the forward ends of the back forks $a^3$ are joined to the corresponding blades or tines $a^7$ of the center stay $a^5$ by brazing or otherwise, with the blades or tines $a^7$ of the center stay extending some distance downward below this point of union, whereby to form ears, as shown more clearly in Fig. 1. The frame A, being thus constructed, receives between its back forks $a^3$ and between its back stays $a^4$ the rear wheel B, which is mounted upon a suitable shaft $b$, that extends across from the rear end of one of the back forks $a^3$ to the rear end of the other, with the ordinary ball-bearings, consisting of the balls $b'$ and conical and other seats $b^2$ and $b^3$, respectively, preferably interposed between it and the interior of the wheel-hub $b^4$. The front wheel C is in like manner arranged between the blades $c$ of the front fork C', in which position it is mounted upon a suitable shaft $c'$, extending across from the lower end of one of these blades to the lower end of the other, and between which and the interior of the hub of this wheel ball-bearings similar to those employed in connection with the rear wheel B may be interposed, if desired. The front fork C', being thus equipped with the wheel C, is provided with the usual handle-bar stem $c^2$, which extends up through the front frame-tube $a^2$ and is provided at its upper end with a handle-bar $c^3$, suitable ball-bearings being interposed between the handle-bar stem and the interior of the front frame-tube, if desired, as is common to bicycles as ordinarily constructed.

D D indicate the pedals, to which the power for effecting the propulsion of the bicycle is applied. These pedals are rotatively mounted at one of their ends upon a shaft $d$, which is supported in the ears formed by the extension of the tines or blades $a^7$ of the center stay $a^5$, with the free ends of these pedals extending forward toward the front of the machine, with suitable ball-bearings interposed between them and such shaft, if desired. From these pedals the power applied thereto is communicated to the rear or other convenient wheel through appropriate clutches arranged in connection with the rear or other driven wheel. These clutches may be constructed in various forms, it only being essential that whatever their form they be so engaged when their respective pedals are depressed as to cause a rotation of the rear or other driven wheel and so disengaged when such pedals are raised as to allow of their resuming their normal positions. As shown in the drawings, however, each of these clutches consists of a disk-like member $e$, which is loosely mounted upon the shaft $b$ at the end of the hub $b^4$, so as to rotate freely thereon, and is provided in its inner face with a cylindrical recess $e^2$ for reception of a second member $e'$, which is fitted loosely therein and is fixedly secured to the hub $b^4$ of the rear wheel B. As thus arranged each of these members $e$ is connected with its respective pedal through a flexible connection E, which, extending upward from the free end of the latter over a pulley $f$, is passed around the former one or more times and the end thereof securely fastened thereto, whereby when its respective pedal D is depressed the flexible connection passing around the said member will be drawn off therefrom and the same rotated thereby. For returning this member $e$, with its appropriate pedal D, to its original or normal position when the power is withdrawn from the latter the spiral spring F is employed, which, arranged within a second recess $e^3$ formed in the hub of the former and connected at one of its ends with the outer curvilinear walls of said recess, as at $i$, is connected at the other, as at $i'$, with a collar formed upon or secured to the shaft $b$. With the parts constructed and arranged as thus explained the rotation of the member $e$ in the direction to propel the bicycle is effected by depressing the pedal and its rotation in the opposite direction accomplished when the propelling power is removed by the spiral spring F.

For engaging the member $e$ of each of the clutches with its coöperating member $e'$ when the appropriate pedal is depressed I make use of the balls $h$, which are arranged within short wedge-shaped pockets $e^4$, that are formed in the curvilinear walls of the recess $e^2$ and severally extend circumferentially around the same for a short distance, with a gradually-increasing depth from its rear to its front end. By this means, as will be seen, when either of the pedals D is depressed and the corresponding member $e$ rotated in the direction of the arrow 1 in Fig. 5 the balls $h$ therein will be carried into the shallower portions of their pockets, and jamming between the outer surfaces thereof and the periphery of the member $e'$ will lock the two members together, thereby causing the latter to move with the former and communicating the power applied to the pedals D to the hub of the rear wheel B. The power having been removed from the particular pedal, its appropriate clutch member $e$, under the action of the spiral spring F, will be rotated backward in the direction of the arrow 2 in Fig. 5, when the balls $h$ will be carried into the deeper portions of their respective pockets, the member $e$ disengaged from the member $e'$ and returned to its normal position, carrying with it its appropriate pedal, ready for the next application of power, and so on, the movement of the pedal downwardly serving to lock the members together and cause the rotation of the rear or other wheel, with the consequent propulsion of the bicycle and the return of the member $e$, and through it its appropriate pedal, to their normal positions, ready for the next downward movement of the latter being effected by the spring F.

For excluding the dust and dirt from between the members $e$ and $e'$ of the clutches the annular plates $k$ are made use of, one of which is secured to the inner face of each of the members $e$ by suitable screws $k'$ and, extending inward to the hub $b^4$ of the rear wheel B, completely covers and envelops the space between the two members, as shown.

In the construction of the flexible connections E it has sometimes been found desirable to adopt the form of either a chain or a rope. It is preferred, however, to construct them in the form of metal ribbons of the proper width and thickness to withstand the strain that may be put upon them, as thereby the maximum strength with the minimum bulk is attained, and the proper winding and unwinding of the same upon and from the members $e$ of the clutches when the bicycle is in operation is more easily and satisfactorily accomplished.

For varying the amount of power communicated from the pedals D to the rear or other driven wheel to suit it to the propulsion of the bicycle upon level planes or up hills or inclines the wheels $f$ are severally mounted upon the frame H, which is capable of being slid back and forth upon the tines or blades $a^6$ of the lower main tube $a'$, whereby the said pulleys may be brought approximately over the free ends of the pedals D or carried backward therefrom toward the shaft $d$, upon which the latter are pivoted. When arranged above the free ends of the pedals or in the position shown by full lines in Fig. 1, these pulleys serve merely as idlers to communicate the power applied to the pedals therefrom to their respective clutches, and the power thus communicated is in no wise increased thereby. When, on the other hand, this frame H is arranged in the position shown in dotted lines in said figure, then in addition to acting as idlers to communicate the power applied to the pedals therefrom to their respective clutches these pulleys also serve as stops, over which the flexible connections E are bent near the pedal-pivoting shaft $d$ when the pedals are depressed, and such pedals thereby caused to act in the manner of toggle-arms with a greatly-increased power upon the clutches, the degree of which increase depending upon the location of such pulleys with respect to the shaft $d$ and the acuteness of the angles that are formed between the flexible connections and their respective pedals. By this means, as will be seen, any power applied to the pedals may be communicated through the flexible connection to the clutches, either without being increased or with an increase, as may be desired, by simply locating the pulleys $f$ in the proper positions with respect to the pivots of the pedals, which may be done by moving the frame along the tines or blades $a^6$ of the lower main tube $a'$ in the required direction, the augmentation of the power communicated from the pedals increasing as the pulleys $f$ approach the pivoting-shaft $d$.

For moving the frame H back and forth along the tines or blades $a^6$ to carry the pulleys $f$ toward or away from the pedal-pivoting shaft $d$, as desired or as an increase or diminution in the power required may demand, a lever $l$ is employed, which, pivoted to a suitable stand or hanger $l^*$ on the upper main tube $a$, is connected at its lower end with the said frame by a suitable connecting-rod $l'$ and is provided near its upper end with a detent $l^2$ for engagement with a notched segment $l^3$, whereby to hold it in any adjusted position. By this means the movement of the frame H along the tines or blades $a^6$ is readily effected and the same locked in any required position by simple devices that are conveniently located for the purposes.

With the parts above described is employed a brake L, which, constructed in the form of a lever and fulcrumed by a pivot between the lower ends of the ears formed by the extension of the tines or blades $a^7$ below the pedals D and adapted to bear at one end against the rear wheel when required, is provided at its other with a pivoted cross-bar $m$. This cross-bar is made of sufficient length to permit of its ends extending under the pedals, with the under side of which they are in contact, and in order to permit of the proper movements of the pedals in the propulsion of the bicycle without applying the brake this cross-bar is loosely pivoted to the end of the brake, whereby to be free to rock thereon. As thus arranged as the pedals are alternately depressed to propel the bicycle this cross-bar is rocked back and forth upon its pivot $m'$, as shown in full and dotted lines in Fig. 7, without in any way affecting the brake, which by a spring or gravity is held clear from the wheel B. When, however, it is desired to apply the brake, then both of the pedals D are depressed, as shown in Fig. 8, the result of which is to carry down both ends of the cross-bar at the same time, and thereby force the brake against the wheel. The brake having been thus applied is removed from contact with the wheel by the raising of one or both of the pedals, when the retracting-spring thereon or the gravity of the bearing portions of the brake carries it back therefrom.

From the foregoing it will be seen that a bicycle is produced which while extremely simple in construction and not liable to get out of order permits of a variation in the power communicated from the pedals to the rear or other wheels, whereby to adapt it to the requirements of the work to be performed, as well as of the employment of a brake that is worked by the pedals and is at all times under the control of the rider.

Although in the foregoing I have described the best means contemplated by me for carrying my invention into practice I wish it distinctly understood that I do not limit myself strictly thereto, as it is obvious that I may modify the same in various ways without departing from the spirit thereof.

Having now described the invention and specified certain of the ways in which it is or may be carried into effect, what is claimed as new, and desired to be secured by Letters Patent of the United States, is the following:

1. The combination, with the frame of a bicycle, the rear wheel of such vehicle, and the clutches arranged in connection with the latter, of pedals jointed at one of their ends in such frame and extended forward toward the front of the machine, flexible connections fixedly attached at one of their ends to the free ends of their respective pedals and at the other ends connected with their appropriate clutches, and pulleys over which the flexible connections are passed on their way from the pedals to the clutches supported upon the frame above the pedals, whereby such pedals when depressed are caused to act as toggle-arms and transmit a gradually-increasing power to the clutches, substantially as described.

2. The combination, with the frame of a bicycle, the rear wheel of such vehicle, clutches arranged in connection with the latter, and pedals jointed at one of their ends in said frame and extended forward toward the front of the machine, of flexible connections fixedly attached at one of their ends to the free ends of their respective pedals and at the other ends connected with their appropriate clutches, pulleys over which these flexible connections are passed on their way from the pedals to the clutches supported upon the frame above the pedals, and devices by means of which these pulleys may be moved toward and away from the pivots upon which the pedals are supported, whereby, in addition to the pedals being caused to act as toggle-arms when depressed and transmit a gradually-increasing power to the clutches, the amount of this power may be varied, substantially as described.

In testimony whereof I have hereunto set my hand this 19th day of May, 1897.

THOMAS L. DENNIS.

Witnesses:
HENRY CALVER,
WM. H. APPLETON.